July 9, 1940.  R. L. BAYLESS  2,206,870
ROTATING LOOP ANTENNA
Original Filed March 4, 1937
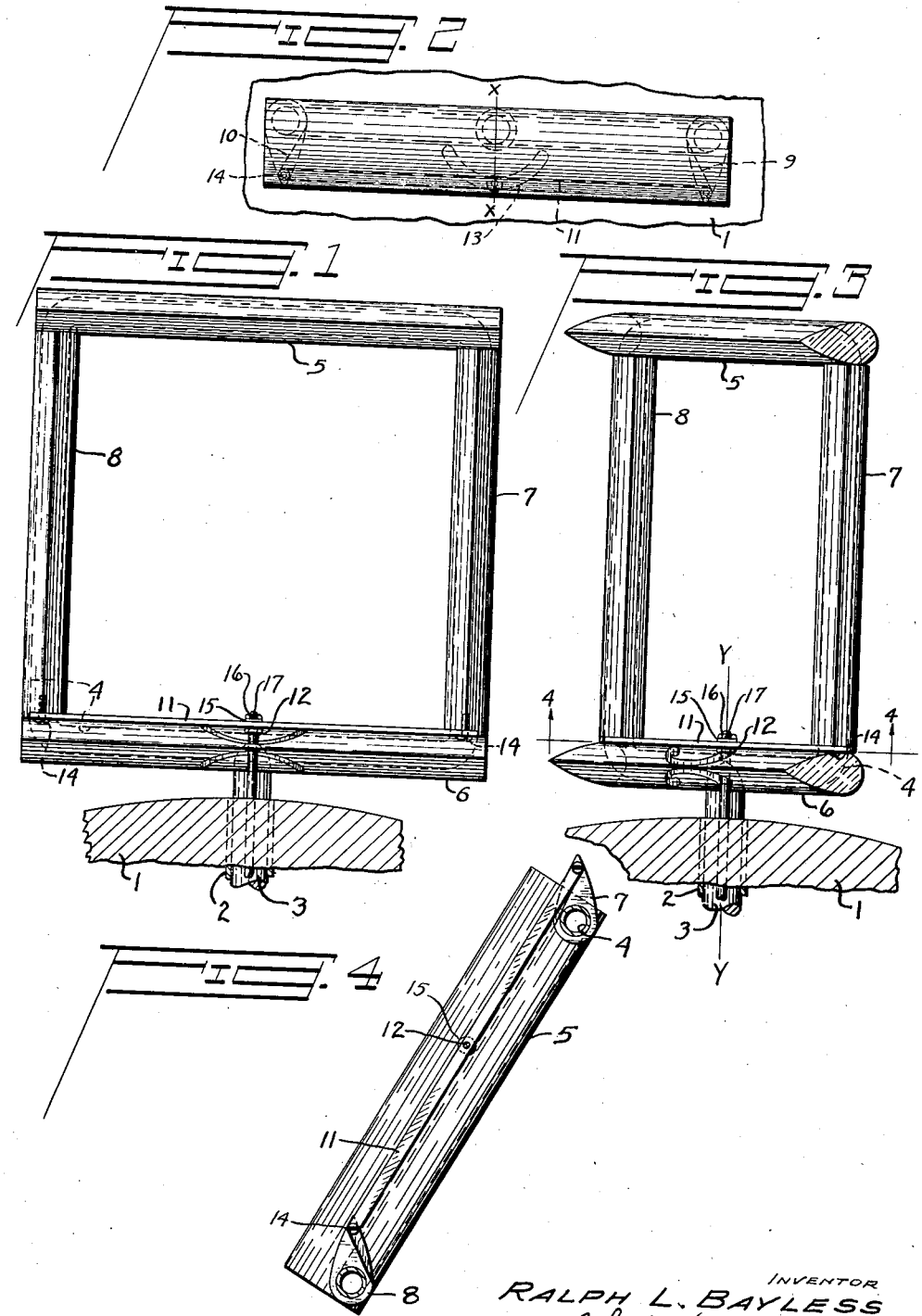
INVENTOR
RALPH L. BAYLESS
BY
ATTORNEYS Patented July 9, 1940

2,206,870

UNITED STATES PATENT OFFICE 2,206,870

ROTATING LOOP ANTENNA

Ralph L. Bayless, San Diego, Calif.

Application March 4, 1937, Serial No. 129,072
Renewed March 9, 1940

2 Claims. (Cl. 250—33)

(Granted under the act of March 3, 1883, as
amended April 30, 1928; 370 O. G. 757)

The invention described herein may be manufactured and used by or for the Government for governmental purposes, without the payment to me of any royalty thereon.

This invention relates to rotating loop antennae adapted for use on aircraft or other rapidly moving vehicles and more particularly to the housings protecting the loop portions of such antennae.

Heretofore it has been the practice to weatherproof vital portions of such a loop within a fixed housing of circular cross-section. While structurally sound, such a housing offers serious aerodynamic resistance, thereby entailing weight increase to establish sufficient rigidity and increased resistance to ready turning due to excessive bending of its supporting shaft.

It is an object of my invention to provide at least one fixed, and one or more movable, streamline portions for encasing the loop of a rotating antenna such that, for effective operating angles of said antenna, the aerodynamic resistance thereof is reduced to a minimum.

With the foregoing and other objects in view, which will appear as the description proceeds, the invention consists of certain new and novel improvements in rotating loop antennae which will be hereinafter more fully illustrated in the accompanying drawing and more particularly pointed out in the appended claims.

Referring to the drawing, in which numerals of like character designate similar parts throughout the several claims:

Figure 1 shows a rear elevation of a loop incorporating my invention, looking forward;

Figure 2 is a top plan view of Figure 1;

Figure 3 shows a further rear elevation, with the loop partially rotated; and

Figure 4 is a cross-sectional view taken on the lines 4—4 of Figure 3.

In Figure 1, to simplify presentation of my invention, I have shown an equi-sided rectangular polygonal antenna loop. Quite obviously, the loop may contain a greater number of sides up to and including a circle. The upper portion of a fuselage 1 is provided with a bearing 2, through which projects a rotatable shaft 3. An inner loop portion 4, of a rotating antenna, is fixed to the upper end of the shaft 3. The horizontal bars of the inner loop portion 4 are looped about with fixed streamline housings 5 and 6, which in Figure 1 are viewed from the trailing edge. The two vertical members of the inner loop portion 4 are looped about with freely floating streamline housings 7 and 8; i. e., the axes of symmetry of the aforesaid housings automatically come into parallelism with the line of flight or course of the aircraft or vehicle to which they are attached. As a further embodiment of my invention, the axes of symmetry of the streamline housings 7 and 8 may be held in parallelism with respect to one another or as a still further embodiment, the aforesaid axes may be mechanically held in alignment with said line of flight; i. e., parallel with the longitudinal axis X—X of the fuselage 1, as shown in Figure 2. In the aforesaid second embodiment, the rear lower extremities of the streamline housings 7 and 8 are provided with cut-outs 9 and 10 to permit installation of a cross bar 11. In the third embodiment of my invention, the cross bar 11 is secured at its mid-portion to the fuselage 1 by means of a mounting stud 12. A further cut-out 13 is provided in the fixed streamline housing 6 to permit free swinging movement of the trailing edge thereof about the mounting stud 12. The cross bar 11 is assembled by means of screws 14, a washer 15, a nut 16 and a cotter pin 17.

It is readily apparent, from a study of Figures 1 and 2, that the loop portion of the antenna hereinabove described may be readily rotated from its normal position to the axis X—X a considerable distance in either a clockwise or a counter-clockwise direction.

Figure 3 shows clockwise rotation of the inner loop portion 4, reference Figure 2, the axis of rotation of the shaft 3 being designated as Y—Y. It will be noted that the streamline housing 8 passes forward and the streamline housing 7 passes aft of a top view of the vertical axis Y—Y. Similar counter-clockwise rotation of the bar 11 is shown in Figure 4, since the view of Figure 2 is here inverted. As has been stated before, the trailing edge of the fixed streamline housing 6 may be provided with the cut-out 13, if it is desired to permit uninterrupted swinging of this member to either side of the mounting stud 12. Through employment of any one of the hereinabove described embodiments of my invention, I am able to obtain greatly reduced aerodynamic resistance of rotating antennae without in any manner interfering with the normal operation of the inner loop portions 4.

Although the description is specific to the illustrations in the drawing, it is to be understood that there may be numerous departures therefrom which will still be within the field and scope of the invention, so that I do not wish to be restricted thereto, but only in so far as the appended claims are so limited.

What I claim as new is:

1. A loop antenna adapted to be rotatably vertically supported by a vehicle comprising, a polygonal ring having its substantially vertically arranged sides provided with separate streamline housings respectively floatingly supported thereby, and means for uniting said housings in such a manner as to cause the planes of symmetry of said floating housings to float in parallelism with one another for reducing aerodynamic resistance.

2. In combination, a loop antenna rotatably vertically supported by and exteriorly of an aircraft, said loop being in the form of a polygonal ring, separate streamline housings respectively floatingly supported by the vertical sides of said ring, and means operatively connected between said housings and said aircraft for positively causing the planes of symmetry of said floating housings to be maintained in parallelism with the plane of symmetry of said aircraft.

RALPH L. BAYLESS.